United States Patent
Bu et al.

(10) Patent No.: US 9,766,631 B2
(45) Date of Patent: Sep. 19, 2017

(54) METHOD AND SYSTEM FOR CONTROLLING AUTOMATIC QUANTITATIVE FLUID SUPPLY

(71) Applicant: BOE TECHNOLOGY GROUP CO., LTD., Beijing (CN)

(72) Inventors: Bin Bu, Beijing (CN); Tailiang Li, Beijing (CN); Yimin Chen, Beijing (CN); Lei Xiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 201 days.

(21) Appl. No.: 14/360,128

(22) PCT Filed: Apr. 8, 2013

(86) PCT No.: PCT/CN2013/073900
§ 371 (c)(1),
(2) Date: May 22, 2014

(87) PCT Pub. No.: WO2014/127564
PCT Pub. Date: Aug. 28, 2014

(65) Prior Publication Data
US 2015/0220087 A1    Aug. 6, 2015

(30) Foreign Application Priority Data

Feb. 25, 2013    (CN) .......................... 2013 1 0059135

(51) Int. Cl.
G05D 7/06    (2006.01)
G01F 13/00   (2006.01)
G05D 7/00    (2006.01)

(52) U.S. Cl.
CPC ............. G05D 7/00 (2013.01); G05D 7/0635 (2013.01); G01F 13/006 (2013.01);
(Continued)

(58) Field of Classification Search
CPC ... B05C 11/1013; B05B 12/02; G05D 7/0173; G05D 7/00; G05D 7/0635; G01F 13/006;
(Continued)

(56) References Cited

U.S. PATENT DOCUMENTS 4,047,655 A * 9/1977 McCafferty .......... B23K 3/0646
137/209
5,755,884 A * 5/1998 Buckler ................ B05B 12/085
118/317
(Continued)

FOREIGN PATENT DOCUMENTS

CN    1266179 A    9/2000
CN    1461430 A    12/2003
(Continued)

OTHER PUBLICATIONS

International Preliminary Report on Patentability dated Aug. 25, 2015; PCT/CN2013/073900.
(Continued)

*Primary Examiner* — John K Fristoe, Jr.
*Assistant Examiner* — Josephine Trinidad-Borges
(74) *Attorney, Agent, or Firm* — Ladas & Parry LLP

(57) ABSTRACT

A method and a system for controlling automatic quantitative fluid supply are disclosed, and the method and the system automatically control the quantitative fluid supply by timing a period of time t required for introducing gas (20) into a sealing tank (4) in such a way that the pressure in the sealing tank (4) reaches a default value and calculating a period of time T, required for continuously introducing the gas (20) into the sealing tank (4) to extrude a fixed volume (V) of the fluid, from the time t, in the process of automatic quantitative fluid supply, so as to automatically control the switching-on and -off of a gas passage (1), overcome the impact of the reduction of the liquid level on the quantitative (Continued)

supply accuracy and guarantee the accuracy requirement of repeated quantitative supply.

8 Claims, 2 Drawing Sheets

(52) U.S. Cl.
CPC .... *Y10T 137/0396* (2015.04); *Y10T 137/3115* (2015.04); *Y10T 137/3127* (2015.04); *Y10T 137/86389* (2015.04)

(58) Field of Classification Search
CPC ............. G02F 1/1341; Y10T 137/0396; Y10T 137/86389
USPC ........ 137/206, 209; 118/691, 692, 684, 696, 118/699
See application file for complete search history.

(56) References Cited

U.S. PATENT DOCUMENTS

| | | | |
|---|---|---|---|
| 5,985,357 A * | 11/1999 | Sanada | B05C 11/08 118/320 |
| 6,165,270 A * | 12/2000 | Konishi | B05C 11/08 118/313 |
| 6,217,657 B1 * | 4/2001 | Kiba | B05D 1/005 118/319 |
| 6,245,148 B1 * | 6/2001 | Liang | H01L 21/6715 118/64 |
| 6,715,506 B1 * | 4/2004 | Ikushima | B05C 5/0225 118/684 |
| 6,790,284 B2 * | 9/2004 | Suzuki | B05C 11/08 118/306 |
| 7,114,517 B2 * | 10/2006 | Sund | G01F 1/8413 137/486 |
| 8,037,894 B1 * | 10/2011 | Kelekar | B01J 19/0046 137/12 |
| 2003/0000578 A1 * | 1/2003 | Lowery | G05D 7/0635 137/487.5 |
| 2006/0225786 A1 | 10/2006 | Kucera et al. | |
| 2007/0017638 A1 | 1/2007 | Moebius | |
| 2008/0289691 A1 | 11/2008 | Roberge et al. | |

FOREIGN PATENT DOCUMENTS

| | | |
|---|---|---|
| CN | 101292134 A | 10/2008 |
| DE | 102006033628 A1 | 2/2007 |
| EP | 1837894 A1 | 9/2007 |
| WO | 2012014374 A1 | 2/2012 |

OTHER PUBLICATIONS

International Search Report Appln. No. PCT/CN2013/073900; Dated Nov. 21, 2013.
First Chinese Office Action Appln. No. 201310059135.0; Dated Feb. 3, 2015.
Extended European Search Report dated Sep. 9, 2016; Appln. 13854210.5-1802/2960745 PCT/CN2013073900.

* cited by examiner

METHOD AND SYSTEM FOR CONTROLLING AUTOMATIC QUANTITATIVE FLUID SUPPLY

TECHNICAL FIELD

Embodiments of the present invention relate to a method and a system for controlling automatic quantitative fluid supply.

BACKGROUND

The main structure of a liquid crystal display (LCD) comprises an array substrate and a color filter substrate arranged opposite to each other; a pixel matrix and a peripheral circuit are formed on the array substrate; the pixel matrix includes a plurality of pixel regions; each pixel region includes a transparent pixel electrode; and RGB color filters and a transparent common electrode, corresponding to the transparent pixel electrode in position, are formed on the color filter substrate. Patterns on the array substrate and the color filter substrate are usually formed through mask patterning processes. In a patterning process, photoresist is coated on a substrate. In order to ensure the exposure effect, the quantitative supply of the photoresist must be achieved.

As illustrated in FIG. 3, a traditional automatic photoresist supply device includes a gas passage 1 and a fluid passage 2 for photoresist passing through; a supply container 3 for accommodating photoresist is disposed within a sealing tank 4; the gas passage 1 is communicated with the sealing tank 4; one end of the fluid passage 2 is disposed in the supply container 3; and the photoresist in the supply container 3 is ejected via a nozzle 7 at the other end of the fluid passage 2 by a pneumatic device by continuously introducing gas 20 (e.g., industrial nitrogen) into the sealing tank 4, and then is coated on the substrate. The specific process of achieving the quantitative photoresist supply by the device is conducted as follows:

At the beginning, the time variable parameters are acquired at the end of the gas passage 1. An electromagnetic valve 5 is disposed on the gas passage 1, and a position sensor 10 is disposed at the nozzle 7 of the photoresist. When the position sensor 10 senses that the substrate is disposed at a proper position of the device by a manipulator so as to be coated with the photoresist, ejection of photoresist is triggered. At this point, the electromagnetic valve 5 is switched on by a control device 8, and the timing process begins.

Subsequently, the quantitative photoresist supply is conducted by the control device 8 to control the supply time period every time. When the timing moment arrives, the electromagnetic valve 5 is switched off by the control device 8 so as to cut off the gas passage 1.

Moreover, the device usually requires a deflation passage 9; one end of the deflation passage is communicated with the sealing tank 4; and an electromagnetic valve 6 is disposed in the midst of the passage. Upon quantitative photoresist supply, the electromagnetic valve 6 is switched off; and after quantitative photoresist supply each time, the electromagnetic valve 6 is switched on by the control device 8 so as to deflate for a period of time (usually 3 to 5 seconds), and hence the pressure in the sealing tank 4 can be restored to the atmospheric pressure.

But along with the increase of supply frequency, the gas space in the sealing tank is widened due to the reduction of the liquid level in the container; and the outlet liquid level of supplied liquid is relatively higher, and hence the amount of photoresist ejected within same ejection time is reduced. The variation is obvious according to the measurement, so that the accuracy requirement of quantitative photoresist supply cannot be satisfied.

SUMMARY

Embodiments of the present invention provide a method and a system for controlling automatic quantitative fluid supply so as to guarantee the accuracy requirement of repeated automatic quantitative fluid supply.

In one aspect, the present invention provides a method for controlling automatic quantitative fluid supply, which comprises: storing a certain amount of fluid in a sealing tank; timing a period of time t required for introducing gas into the sealing tank in such a way that the pressure in the sealing tank reaches a default value; and subsequently calculating a period of time T, required for continuously introducing the gas into the sealing tank to extrude a fixed volume of the fluid, from the time t, so as to automatically control the switching—on and —off of a gas passage.

In the method for controlling automatic quantitative fluid supply as described above, for instance, the time T is calculated from the time t according to a predetermined formula, and a step of obtaining the predetermined formula comprises: repeatedly acquiring relationship between time $t_i$ required for introducing the gas into the sealing tank in such a way that the pressure in the sealing tank reaches the default value and time $T_i$ required for continuously introducing the gas into the sealing tank in such a way that the fluid of a fixed volume can be extruded from the sealing tank, namely $T_i = f(t_i)$.

In the method for controlling automatic quantitative fluid supply as described above, for instance, the step of obtaining the predetermined formula comprises:

100, storing a certain amount of fluid in the sealing tank and marking i=0;

101, introducing the gas into the sealing tank for a period of time $t_i$, so that the pressure in the sealing tank reaches the default value, and storing $t_i$;

102, continuously introducing the gas into the sealing tank for a period of time $T_i$, so that the volume of the fluid extruded from the sealing tank can be a fixed value, and storing $T_i$;

103, i+1;

104, repeating the steps 101, 102 and 103 when i≤n; and

105, calculating $p_m$ in $$T_i = f(t_i) = \varepsilon \sum_{m=0}^{n} p_m t_i^m$$

according to a plurality of groups of $t_i$ and $T_i$ when i>n, in which ε refers to a constant relevant to the kinematic viscosity of the fluid.

In the method for controlling automatic quantitative fluid supply as described above, for instance, n≥4.

In the method for controlling automatic quantitative fluid supply as described above, for instance, the gas pressure in the gas passage is regulated according to the kinematic viscosity of the fluid stored in the sealing tank before the gas is introduced into the sealing tank.

Meanwhile, in another aspect, the present invention further provides a system for controlling automatic quantitative fluid supply, which comprises a control device and a pressure sensor; the pressure sensor is configured to detect the pressure in a sealing tank; the control device includes a timing module and a control module; the timing module is configured to time a period of time t required for introducing gas into the sealing tank in such a way that the pressure in the sealing tank reaches a default value; and the control module is configured to calculate a period of time T, required for continuously introducing the gas into the sealing tank to extrude a fixed volume of the fluid after introducing the gas into the sealing tank for the period of time t, from the time t, so as to automatically control the switching—on and —off of a gas passage.

In the system for controlling automatic quantitative fluid supply as described above, for instance, the control device further includes an acquisition module configured to repeatedly acquire relationship between time $t_i$ required for introducing the gas into the sealing tank in such a way that the pressure in the sealing tank reaches the default value and time $T_i$ required for continuously introducing the gas into the sealing tank in such a way that the fluid of a fixed volume can be extruded from the sealing tank, and hence obtain a predetermined formula $Ti=f(t_i)$ so as to calculate the time T from the time t.

In the system for controlling automatic quantitative fluid supply as described above, for instance, the system further comprises a regulation module configured to regulate the gas pressure in the gas passage according to the kinematic viscosity of the fluid stored in the sealing tank.

In the system for controlling automatic quantitative fluid supply as described above, for instance, the regulation module is a pressure regulating valve disposed in a midst of the gas passage.

In the system for controlling automatic quantitative fluid supply as described above, for instance, an electromagnetic valve is disposed on the gas passage; an instruction output end of a control module is connected with the electromagnetic valve; and the control module is configured to control the switching—on and —off of the electromagnetic valve according to the time T so as to automatically control the switching—on and —off of the gas passage.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

REFERENCE NUMERALS

1: Gas Passage; 2: Fluid Passage; 3: Supply Container; 4: Sealing tank; 5, 6: Electromagnetic valve; 7: Nozzle; 8: Control Device; 9: Deflation passage; 10: Position Sensor; 11: Acquisition Module; 12: Control Module; 13: Timing Module; 14: Regulation Module; 15: Pressure Sensor; 20: Gas.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Unless otherwise defined, the technical terms or scientific terms used herein have normal meanings understood by those skilled in the art. The words "a", "an", "the" and the like also do not indicate the number but only indicate at least one. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

Embodiment 1

Figure 1:
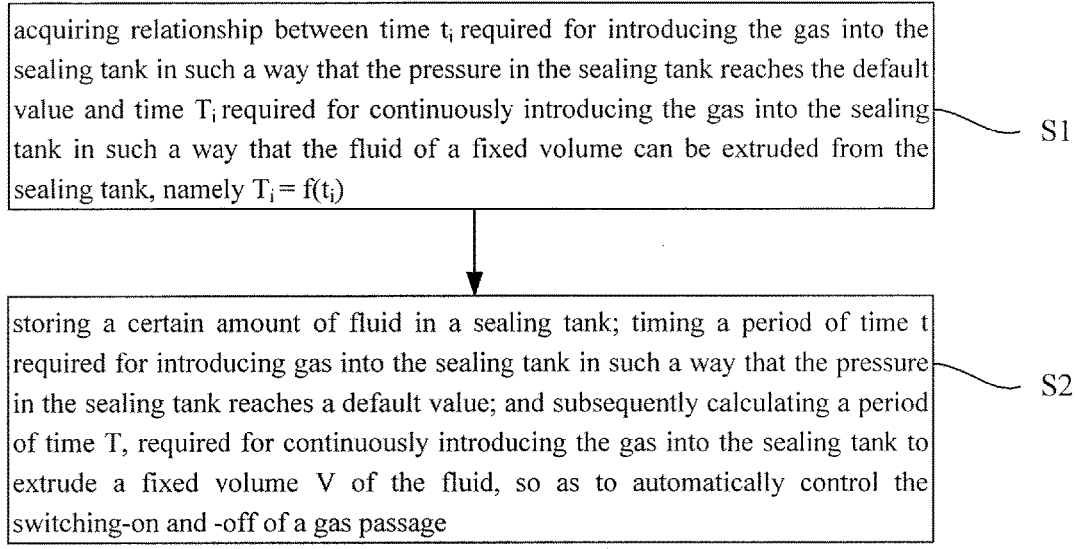
FIG. 1 is a flowchart of a method for controlling automatic quantitative fluid supply provided by an embodiment of the present invention.

FIG. 1 is a flowchart of a method for controlling automatic quantitative fluid supply provided by the embodiment of the present invention. As illustrated in FIG. 1, the method for controlling automatic quantitative fluid supply provided by the embodiment of the present invention comprises the following steps: storing a certain amount of fluid in a sealing tank; timing the time t required for introducing gas into the sealing tank in such a way that the pressure in the sealing tank reaches a default value; and, for instance, calculating the time T, required for continuously introducing the gas into the sealing tank to extrude a fixed volume of the fluid, over the time t according to a predetermined formula, so as to automatically control the switching—on and —off of a gas passage.

The operation of a fluid passage relevant to the on-off operation of the gas passage may be as follows: within time t and T after a certain amount of fluid is stored in the sealing tank, the fluid passage for discharging the sealing tank may be all switched on; and hence the fluid can be extruded from the sealing tank while no photoresist can flow out within time t, because usually the pressure in the sealing tank is atmospheric pressure when the gas is introduced at the beginning, and photoresist cannot be extruded until the pressure reaches the default value subsequently, but the fluid of a fixed volume can flow out from the sealing tank within the time T due to other pressure. Of course, the fluid passage for discharging the sealing tank may also be switched off within the time t.

Herein, there is a certain non-linear corresponding relationship between the time t and the time T in the predetermined formula. The nonlinear corresponding relationship is relevant to the size of a specific sealing tank adopted, parameters (e.g., pressure and flow rate) of the gas passage, properties (e.g., kinematic viscosity) of the fluid and the like.

But as for a specific system with fixed factors, the specified nonlinear corresponding relationship may be obtained by, for instance, the method as described below.

The method for achieving automatic quantitative fluid supply by extruding the fluid from the sealing tank by a pneumatic device has the advantage of stable and controllable fluid flow and can achieve quantitative fluid supply through control on the introduction time of the gas. As described above, along with the increased supply frequency, the outlet liquid level of the fluid is relatively higher and the gas space in the sealing tank is larger, and hence less and less fluid can be extruded by the introduction of the gas within a same time, and consequently the accuracy requirement of quantitative supply cannot be guaranteed. Therefore, in the process of automatic quantitative fluid supply, the introduction time of the gas must be compensated in such a way that the fluid supplied is in a same volume each time, and the gas introduction time compensated each time is different, namely there is no linear relationship between the time of introducing the gas into the sealing tank and the supplied fluid flow.

In the embodiment, the time error in the process of quantitative supply due to the reduction of the liquid level can be effectively compensated by the time T calculated according to the predetermined formula, and hence the accuracy of repeated automatic quantitative supply can be guaranteed.

In the embodiment, the predetermined formula $T_i = f(t_i)$ can be obtained to calculate the time T from the time t by acquiring the relationship between the time $t_i$ required for introducing the gas into the sealing tank in such a way that the pressure in the sealing tank reach the default value and the time $T_i$ required for continuously introducing the gas into the sealing tank in such a way that the fluid of a fixed volume can be extruded from the sealing tank, and hence the gas introduction time of quantitative supply each time can be accurately controlled, and consequently the accuracy requirement of quantitative fluid supply can be guaranteed. Because the time t required for introducing the gas into the sealing tank in such a way that the pressure in the sealing tank reaches the default value is in positive correspondence with the liquid level in the sealing tank and can be easily acquired, only the time t is required to be acquired in the process of automatic quantitative fluid supply and then the gas introduction time after compensation can be calculated according to the formula $T_i = f(t_i)$, and in this way, the switching—on and —off of the gas passage can be automatically controlled; the impact of the reduction of the liquid level on the accuracy of quantitative fluid supply can be effectively overcome; and the accuracy requirement of repeated quantitative supply can be guaranteed.

The method for controlling automatic quantitative photoresist supply will be taken as an example and described below to specifically illustrate the process of obtaining the predetermined formula by acquiring the relationship between the time $t_i$ required for introducing the gas into the sealing tank in such a way that the pressure in the sealing tank reaches the default value and the time $T_i$ required for continuously introducing the gas into the sealing tank in such a way that the fluid of a fixed volume can be extruded from the sealing tank.

100. Storing a certain amount of fluid in a sealing tank and marking i=0.

The step is specific as follows: a certain amount of photoresist (generally, the kinematic viscosity of the photoresist is known) is stored in the sealing tank of an applied device, and preferably, the volume of the stored photoresist is the same as that of photoresist (the kinematic viscosity of the photoresist is also known) stored in the sealing tank in the process of automatic quantitative photoresist supply, and hence the consistency of the operating environment can be guaranteed and the accuracy of quantitative supply can be improved.

101. Introducing gas into the sealing tank for a period of time $t_i$, so that the pressure in the sealing tank reaches a default value, and storing $t_i$.

The default value may be the value of any pressure in the sealing tank before a fluid is extruded from the sealing tank.

102. Continuously introducing the gas into the sealing tank for a period of time $T_i$, so that the volume of the fluid extruded from the sealing tank can be of a fixed value, and storing $T_i$;

Preferably, the volume of the fluid extruded from the sealing tank is the same as that of the photoresist supplied each time in the process of automatic quantitative photoresist supply, and hence the consistency of the operating environment can be further guaranteed and the accuracy of quantitative supply can be improved.

103. i+1.

104. Repeating the steps 101, 102 and 103 when i≤n.

The automatic quantitative fluid supply process can be simulated by repeating the steps 101, 102 and 103, and a plurality of groups of $t_i$ and $T_i$ can be obtained so as to calculate the relationship between $t_i$ and $T_i$, namely a predetermined formula: $T_i = f(t_i)$. If more groups of $t_i$ and $T_i$ are acquired, the accuracy become higher. In the embodiment, preferably n≥4, so that the accuracy requirement of quantitative supply can be satisfied.

105. Calculating $p_m$ in the formula $$T_i = f(t_i) = \varepsilon \sum_{m=0}^{n} p_m t_i^m$$

according to a plurality of groups of $t_i$ and $T_i$ when i>n, in which E refers to a constant that is relevant to the kinematic viscosity of the fluid. $p_m$ is a coefficient, and m, beginning from 0, namely m0, m1, m2 . . . , is a coefficient in an equation and is an unknown number to be solved.

The photoresist required in different patterning processes is different and has different kinematic viscosities. Moreover, when the kinematic viscosity of the photoresist become lower, the time required for introducing the gas into the sealing tank to extrude the photoresist by a fixed volume is shorter. That is to say, the time $T_i$ is in positive correspondence with the kinematic viscosity of the photoresist. More specifically, $$\varepsilon = \frac{v_{liquid} \cdot \rho_{liquid}}{v'_{liquid} \cdot \rho'_{liquid}},$$

wherein $v_{liquid}$ refers to the kinematic viscosity of the photoresist in the process of automatic quantitative supply; $\rho_{liquid}$ refers to the density of the photoresist in the process of automatic quantitative supply; $v'_{liquid}$ refers to the kinematic viscosity of the photoresist in the step 100, and $\rho'_{liquid}$ refers to the density of the photoresist in the step 100.

Of course, the volume of the fluid extruded from the sealing tank in the step 102 may be also different from the volume of the fluid extruded from the sealing tank in the process of automatic quantitative photoresist supply. Correspondingly, $$\varepsilon = \frac{v_{liquid} \cdot \rho_{liquid} V_{liquid}}{v'_{liquid} \cdot \rho'_{liquid} V'_{liquid}},$$

wherein $V_{liquid}$ refers to the volume of the fluid extruded from the sealing tank in the process of automatic quantitative photoresist supply, and $V'_{liquid}$ refers to the volume of the fluid extruded from the sealing tank in the step 102.

It should be noted that the process of obtaining the predetermined formula in the embodiment is only described herein by taking the photoresist as an example; the present invention is not limited thereto; and the process can also be achieved by taking a fluid as an example, for instance, an adhesive required to be coated.

Before the gas is introduced into the sealing tank, the gas pressure in the gas passage can also be regulated according to the kinematic viscosity of the fluid stored in the sealing tank, so that the flow rate of the fluid extruded from the sealing tank can be the same, and hence the impact of the kinematic viscosity of the fluid on the gas introduction time can be overcome.

The kinematic viscosity of various fluids can be obtained through measurement by any method known in the field.

Embodiment 2

Figure 2:
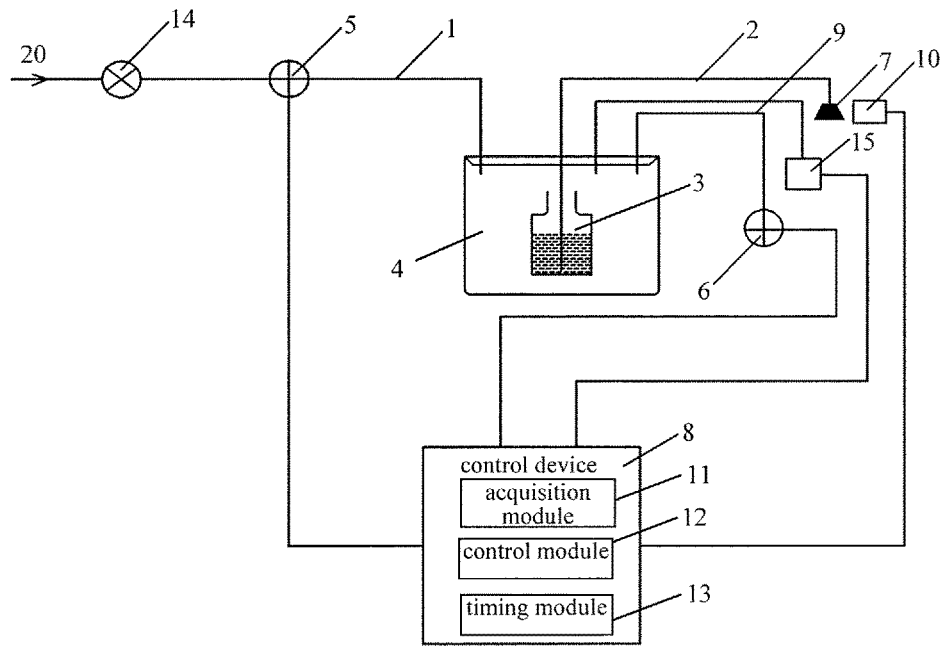
FIG. 2 is a schematic composition diagram of a system for controlling automatic quantitative fluid supply provided by an embodiment of the present invention.
Figure 3:
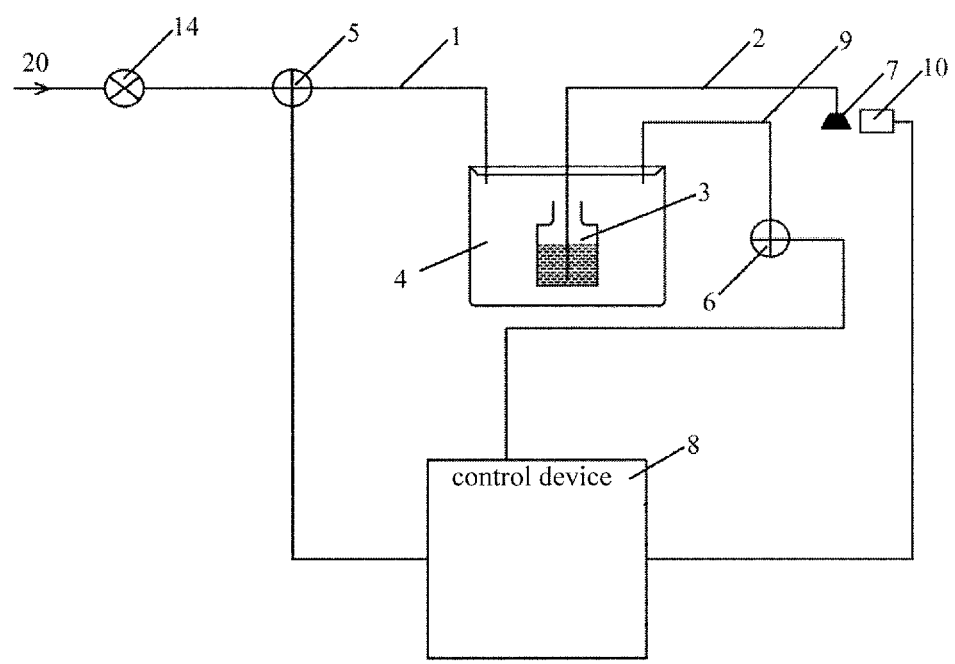
FIG. 3 is a schematic composition diagram of an automatic photoresist supply device.

The embodiment provides a system for implementing the method for controlling automatic quantitative fluid supply provided by the embodiment 1. As illustrated in FIG. 2, the system comprises a control device 8 and a pressure sensor 15. The control device 8 includes a timing module 13 and a control module 12. In the process of automatic quantitative fluid supply, the timing module 13 is configured to time the time t required for introducing gas 20 into a sealing tank 4 in such a way that the pressure in the sealing tank 4 reaches a default value; and subsequently, the control module 12 is configured to calculate the time T, required for continuously introducing the gas 20 into the sealing tank 4 to extrude a fixed volume of the fluid V after introducing the gas 20 into the sealing tank 4 for a period of time t, according to the time t and, for instance, over the period of time t according to a predetermined formula, so as to automatically control the switching—on and —off of a gas passage 1 and achieve the automatic quantitative fluid supply. The pressure sensor 15 is configured to detect the pressure in the sealing tank 4.

Moreover, the control device 8 may further include an acquisition module 11 configured to acquire the relationship between the time $t_i$ required for introducing the gas 20 into the sealing tank 4 in such a way that the pressure in the sealing tank 4 can reach the default value (the default value may be the value of any pressure in the sealing tank 4 before the fluid is extruded from the sealing tank 4) and the time $T_i$ required for continuously introducing the gas 20 into the sealing tank 4 to extrude the fluid of a fixed volume from the sealing tank 4, and hence obtain the predetermined formula $T_i=f(t_i)$. Preferably, the volume of the extruded fluid is the same as the volume V of the fluid extruded each time in the process of automatic quantitative supply.

In order to automatically control the switching—on and —off of the gas passage 1, preferably, a valve, e.g., an electromagnetic valve 5, is disposed on the gas passage 1. An instruction output end of the control module 12 is connected with the electromagnetic valve 5, so that the electromagnetic valve 5 can be controlled according to the time T, and hence the switching—on and —off of the gas passage 1 can be automatically controlled.

Moreover, the system provided by the embodiment may also be provided with a regulation module 14, for instance, a pressure regulating valve is disposed in the midst of the gas passage 1 and configured to regulate the pressure of the gas 20 in the gas passage 1 according to the kinematic viscosity of the fluid stored in the sealing tank 4, so as to guarantee the same flow rate of the fluid extruded from the sealing tank 4 and overcome the impact of the kinematic viscosity of the fluid on the gas introduction time.

The working principle of the acquisition module 11 will be further described below by taking a system for controlling automatic quantitative photoresist supply as an example.

Firstly, photoresist of a fixed volume V' is stored in a sealing tank 4, and a pressure regulating valve 14 is regulated according to the kinematic viscosity of the photoresist so as to regulate the pressure of supplied gas 20 in a gas passage 1.

Secondly, an electromagnetic valve 5 is switched on to introduce the gas 20 into the sealing tank; and the volume of the extruded fluid is measured at a nozzle 7 and, for instance, is controlled to be same as the volume of a photoresist supplied each time in the process of automatic quantitative photoresist supply, and may be a fixed value. Meanwhile, a pressure sensor 15 is configured to measure the pressure in the sealing tank 4 in real time; and the time $t_i$ for driving the pressure in the sealing tank 4 to reach a default value (the default value may be the value of any pressure in the sealing tank before a fluid is extruded from the sealing tank) and the time $T_i$ required for continuously introducing the gas into the sealing tank 4 to extrude the photoresist with fixed volume are timed. The step is repeated so as to acquire a plurality of groups of $t_i$ and $T_i$, and hence the relationship between $t_i$ and $T_i$ can be calculated as described above:

$$T_i = f(t_i) = \varepsilon \sum_{m=0}^{n} p_m t_i^m.$$

Correspondingly, in the process of automatic quantitative photoresist supply, at first, photoresist of a fixed volume is also stored in the sealing tank 4, and, preferably, the volume of the stored photoresist is also V'; meanwhile, as the photoresist required by each patterning process may be different and a different kind of photoresist may also have different kinematic viscosities, the pressure regulating valve 14 is regulated according to the kinematic viscosity of the photoresist so as to regulate the pressure of the supply gas 20 in the gas passage 1; and subsequently, the control module 12 may calculate the time T required for continuously introducing the gas 20 into the sealing tank 4 to extrude quantitative photoresist according to the above formula $$T_i = f(t_i) = \varepsilon \sum_{m=0}^{n} p_m t_i^m$$

only by acquiring the time t required for introducing the gas 20 into the sealing tank 4 in such a way that the pressure in the sealing tank 4 can reach a default value, so as to automatically control the switching—on and —off of the electromagnetic valve 5 and achieve automatic quantitative photoresist supply.

As seen from the above embodiments, the method and the system for controlling automatic quantitative fluid supply provided by the embodiment can automatically control the switching—on and —off of the gas passage and hence automatically control quantitative fluid supply by timing the time t required for introducing the gas into the sealing tank in such a way that the pressure in the sealing tank reaches the default value and, for instance, calculating the time T required by continually introducing the gas into the sealing tank to extrude the fluid of a fixed volume V according to the predetermined formula. Moreover, the method and the system can overcome the impact of the reduction of the liquid level on the accuracy of quantitative supply and guarantee the accuracy requirement of repeated quantitative supply.

The foregoing is only the preferred embodiments of the present invention and not intended to limit the scope of protection of the present invention. The scope of protection of the present invention should be defined by the appended claims.

The invention claimed is:

1. A method for controlling automatic quantitative fluid supply, comprising the following steps:
    storing a certain amount of fluid in a sealing tank; timing a period of time t required for introducing gas into the sealing tank in such a way that the pressure in the sealing tank reaches a default value; and subsequently calculating a period of time T, required for continuously introducing the gas into the sealing tank to extrude a fixed volume of the fluid, from the time t, so as to automatically control switching-on and -off of a gas passage, wherein within time t and T, fluid passage for discharging the sealing tank is switched on, and no fluid flow out within time t,
    wherein the time T is calculated from the time t according to a predetermined formula, and a step of obtaining the predetermined formula comprises:
    repeatedly acquiring relationship between time $t_i$ required for introducing the gas into the sealing tank in such a way that the pressure in the sealing tank reaches the default value and time $T_i$ required for continuously introducing the gas into the sealing tank in such a way that the fluid of a fixed volume can be extruded from the sealing tank, namely $T_i=f(t_i)$.

2. The method for controlling automatic quantitative fluid supply according to claim 1, wherein the step of obtaining the predetermined formula comprises:
    100, storing another certain amount of fluid in the sealing tank and marking i=0;
    101, introducing the gas into the sealing tank for the period of time $t_i$, so that the pressure in the sealing tank reaches the default value, and storing $t_i$;
    102, continuously introducing the gas into the sealing tank for a period of time $T_i$, so that the volume of the fluid extruded from the sealing tank can be a fixed value, and storing $T_i$;
    103, i+1;
    104, repeating the steps 101, 102 and 103 when i≤n, wherein n is a number of times for repeatedly acquiring the relationship; and
    105, calculating $p_m$ in $$T_i = f(t_i) = \varepsilon \sum_{m=0}^{n} p_m t_i^m$$

according to a plurality of groups of the $t_i$ and the $T_i$ when i>n, in which ε refers to a constant relevant to the kinematic viscosity of the fluid and $p_m$ is a coefficient.

3. The method for controlling automatic quantitative fluid supply according to claim 2, wherein n≥4.

4. The method for controlling automatic quantitative fluid supply according to claim 1, wherein the gas pressure in the gas passage is regulated according to the kinematic viscosity of the fluid stored in the sealing tank before the gas is introduced into the sealing tank.

5. A system for controlling automatic quantitative fluid supply, comprising a control device and a pressure sensor, the pressure sensor being configured to detect the pressure in a sealing tank, the control device comprising a timing module and a control module,
    the timing module being configured to time a period of time t required for introducing gas into the sealing tank in such a way that the pressure in the sealing tank reaches a default value,
    the control module being configured to calculate a period of time T, required for continuously introducing the gas into the sealing tank to extrude a fixed volume of the fluid after introducing the gas into the sealing tank for the period of time t, from the time t, so as to automatically control the switching-on and -off of a gas passage, wherein within time t and T, fluid passage for discharging the sealing tank is switched on, and no fluid flow out within time t,
    wherein the control device further includes an acquisition module configured to repeatedly acquire relationship between time $t_i$ required for introducing the gas into the sealing tank in such a way that the pressure in the sealing tank reaches the default value and time $T_i$ required for continuously introducing the gas into the sealing tank in such a way that the fluid of a fixed volume can be extruded from the sealing tank, and hence obtain a predetermined formula $T_i=f(t_i)$ so as to calculate the time T from the time t.

6. The system for controlling automatic quantitative fluid supply according to claim 5, further comprising a regulation module configured to regulate the gas pressure in the gas passage according to the kinematic viscosity of the fluid stored in the sealing tank.

7. The system for controlling automatic quantitative fluid supply according to claim 6, wherein the regulation module is a pressure regulating valve disposed in a midst of the gas passage.

8. The system for controlling automatic quantitative fluid supply according to claim 5, wherein an electromagnetic valve is disposed on the gas passage; an instruction output end of the control module is connected with the electromagnetic valve; and the control module is configured to control the switching-on and -off of the electromagnetic valve according to the time T so as to automatically control the switching-on and -off of the gas passage.

* * * * *